United States Patent
Kwon et al.

(10) Patent No.: US 10,008,753 B2
(45) Date of Patent: Jun. 26, 2018

(54) ELECTROCHEMICAL BATTERY AND METHOD OF OPERATING THE SAME

(71) Applicant: Samsung Electronics Co., Ltd., Suwon-si, Gyeonggi-do (KR)

(72) Inventors: Hyukjae Kwon, Suwon-si (KR); Jeongsik Ko, Seongnam-si (KR); Heungchan Lee, Seongnam-si (KR); Dongmin Im, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 46 days.

(21) Appl. No.: 15/201,732

(22) Filed: Jul. 5, 2016

(65) Prior Publication Data

US 2017/0012333 A1    Jan. 12, 2017

(30) Foreign Application Priority Data

Jul. 8, 2015    (KR) .................. 10-2015-0097159
Jun. 13, 2016    (KR) .................. 10-2016-0073213

(51) Int. Cl.
*H01M 12/08*    (2006.01)
*H01M 8/04791*    (2016.01)
(Continued)

(52) U.S. Cl.
CPC ......... *H01M 12/08* (2013.01); *H01M 8/0432* (2013.01); *H01M 8/04089* (2013.01);
(Continued)

(58) Field of Classification Search
CPC .. H01M 12/06; H01M 12/08; H01M 8/04089; H01M 8/04171; H01M 8/0432;
(Continued)

(56) References Cited

U.S. PATENT DOCUMENTS

| 4,376,691 A | 3/1983 | Lindstrom |
| 5,560,999 A | 10/1996 | Pedicini et al. |

(Continued)

FOREIGN PATENT DOCUMENTS

| JP | 3349801 B2 | 9/2002 |
| JP | 2009129602 A | 6/2009 |

(Continued)

OTHER PUBLICATIONS

Gallagher et al., "Quantifying the promise of lithium-air batteries for electric vehicles*", Energy & Environmental Science, vol. 7, 2014, pp. 1555.

(Continued)

*Primary Examiner* — Carlos Barcena
(74) *Attorney, Agent, or Firm* — Cantor Colburn LLP

(57) ABSTRACT

A electrochemical battery including: a battery module including one or more metal air cells which use oxygen gas as a positive electrode active material; an air supply configured to supply air to the battery module and to adjust an oxygen concentration in air supplied to the battery module; and a control unit configured to control an oxygen concentration adjusting operation of the air supply unit. Also a method of operating the electrochemical battery including: supplying air to a battery module using an air supply unit, the battery module including one or more metal air cells which use oxygen in air as a positive electrode active material; and controlling the air supply unit to adjust an oxygen concentration in the air supplied to the battery module.

28 Claims, 10 Drawing Sheets

(51) Int. Cl.
   *H01M 8/04537*  (2016.01)
   *H01M 8/0432*   (2016.01)
   *H01M 8/04089*  (2016.01)
   *H01M 8/04119*  (2016.01)
   *H01M 12/06*    (2006.01)

(52) U.S. Cl.
   CPC ... *H01M 8/04171* (2013.01); *H01M 8/04335* (2013.01); *H01M 8/04544* (2013.01); *H01M 8/04574* (2013.01); *H01M 8/04634* (2013.01); *H01M 8/04798* (2013.01); *H01M 12/06* (2013.01); *Y02E 60/128* (2013.01)

(58) Field of Classification Search
   CPC ......... H01M 8/04335; H01M 8/04544; H01M 8/04574; H01M 8/04634; H01M 8/04798
   See application file for complete search history.

(56) References Cited

U.S. PATENT DOCUMENTS

| | | | |
|---|---|---|---|
| 7,282,295 B2 | 10/2007 | Visco et al. | |
| 7,691,536 B2 | 4/2010 | Johnson | |
| 7,767,345 B2 | 8/2010 | Imagawa et al. | |
| 8,557,414 B2 | 10/2013 | Hermann et al. | |
| 2002/0160247 A1* | 10/2002 | Tzeng | F28D 7/024 429/440 |
| 2002/0166763 A1 | 11/2002 | Tsai et al. | |
| 2007/0231704 A1 | 10/2007 | Inda | |
| 2008/0070087 A1 | 3/2008 | Johnson | |
| 2011/0059355 A1 | 3/2011 | Zhang et al. | |
| 2011/0129739 A1 | 6/2011 | Nakanishi | |
| 2011/0223494 A1 | 9/2011 | Feaver et al. | |
| 2012/0077084 A1 | 3/2012 | Christensen et al. | |
| 2012/0077095 A1 | 3/2012 | Roumi et al. | |
| 2012/0115048 A1 | 5/2012 | Roev et al. | |
| 2012/0141889 A1 | 6/2012 | Lee et al. | |
| 2012/0276459 A1 | 11/2012 | Im et al. | |
| 2013/0108934 A1 | 5/2013 | Lee et al. | |
| 2013/0224609 A1 | 8/2013 | Lee et al. | |
| 2013/0330639 A1 | 12/2013 | Lee et al. | |
| 2013/0344401 A1 | 12/2013 | Albertus et al. | |
| 2014/0011101 A1 | 1/2014 | Ma et al. | |
| 2014/0234733 A1 | 8/2014 | Roev et al. | |
| 2014/0272611 A1* | 9/2014 | Albertus | H01M 12/08 429/405 |
| 2015/0079485 A1 | 3/2015 | Choi et al. | |
| 2016/0043408 A1 | 2/2016 | Kwon et al. | |
| 2016/0322685 A1 | 11/2016 | Choi | |

FOREIGN PATENT DOCUMENTS

| | | |
|---|---|---|
| JP | 2011-222427 A1 | 11/2011 |
| KR | 10-1471793 B1 | 12/2014 |
| WO | 99/52170 A1 | 10/1999 |

OTHER PUBLICATIONS

Yang et al.,"The effect of oxygen pressures on the electrochemical profile of lithium/oxygen battery", J. Solid State Electrochem, vol. 14, 2010, pp. 109-114.

EP European Search Report for European Patent Application No. 16177319.7 dated Oct. 20, 2016.

* cited by examiner

ELECTROCHEMICAL BATTERY AND METHOD OF OPERATING THE SAME

CROSS-REFERENCE TO RELATED APPLICATION

This application claims priority to and the benefit of Korean Patent Application No. 10-2015-0097159, filed on Jul. 8, 2015, and Korean Patent Application No. 10-2016-0073213, filed on Jun. 13, 2016, in the Korean Intellectual Property Office, and all the benefits accruing therefrom under 35 U.S.C. § 119, the contents of which in their entirety are herein incorporated by reference.

BACKGROUND

1. Field

The present disclosure relates to an electrochemical battery and a method of operating the same.

2. Description of the Related Art

Of electrochemical batteries, a metal air battery and a fuel battery have a common feature in that air including oxygen is supplied to a cathode. For example, a metal air battery includes a plurality of metal air cells, and each of the metal air cells includes an anode that adsorbs and emits ions and a cathode that uses oxygen in air as an active material. A reduction/oxidation reaction of oxygen introduced from the outside occurs at the cathode, and an oxidation/reduction reaction of a metal occurs at the anode. The metal air battery changes chemical energy generated by the oxidation/reduction reaction into electrical energy and outputs the electrical energy. For example, the metal air battery absorbs oxygen during discharging and emits oxygen during charging.

In addition, the fuel battery is a device that directly converts chemical energy of a fuel into electrical energy by an electrochemical reaction and is a type of a power generation device that is capable of continuously generating electricity as long as a fuel is supplied thereto. In the fuel battery, when air including oxygen is supplied to a cathode and a fuel such as methanol or hydrogen is supplied to an anode, an electrochemical reaction occurs through an electrolyte membrane between the cathode and the anode, thereby generating electricity.

SUMMARY

Additional aspects will be set forth in part in the description which follows and, in part, will be apparent from the description, or may be learned by practice of the presented exemplary embodiments.

According to an aspect of an exemplary embodiment, an electrochemical battery includes: a battery module including one or more electrochemical cells; an air supply unit configured to supply air to the battery module and to adjust an oxygen concentration in the air that is supplied to the battery module; and a control unit configured to control an oxygen concentration adjusting operation of the air supply unit.

The air supply unit may be configured to adjust the oxygen concentration in the air supplied to the battery module by adjusting an adsorption amount of nitrogen in air under control of the control unit.

The control unit may be configured to control the air supply unit so as to variably adjust the oxygen concentration in the air supplied to the battery module according to a state of the battery module.

The control unit may control the air supply unit so as to constantly maintain the oxygen concentration in the battery module at a preset concentration.

When the oxygen concentration is less than the preset concentration, the control unit may control the air supply unit so as to increase the oxygen concentration in the air supplied to the battery module, and when the oxygen concentration is greater than the preset concentration, the control unit may control the air supply unit so as to decrease the oxygen concentration in the air supplied to the battery module.

The preset oxygen concentration may be in a range between a value equal to or greater than about 30% and a value less than about 100% based on a total content of the air.

The control unit may control the air supply unit so as to constantly maintain the oxygen concentration in the air supplied to the battery module in a range between a value equal to or greater than about 30% and a value less than about 100% based on a total content of the air.

The electrochemical battery may further include a sensing unit configured to measure at least one parameter of an oxygen concentration in the battery module, a temperature in the battery module, a voltage of the battery module, a current output of the battery module, and a load resistance of a load to be connected to the battery module.

The control unit may control the air supply unit so as to adjust the oxygen concentration in the air supplied to the battery module based on the at least one parameter measured by the sensing unit.

When the voltage of the battery module is less than a preset voltage during a electricity generation operation of the battery module, the control unit may control the air supply unit so as to increase the oxygen concentration in the air supplied to the battery module.

The control unit may include a display unit configured to display the at least one parameter measured by the sensing unit and an input unit configured to receive a user command.

The control unit may control the oxygen concentration in the battery module at a concentration through the input unit.

The air supply unit may include: an air suction unit configured to suction air from the outside; and an oxygen generation unit configured to generate oxygen by separating oxygen from the suctioned air.

The oxygen generation unit may be configured to filter oxygen via an adsorption/desorption method or a membrane method.

The adsorption/desorption method may be at least one selected from among a pressure swing adsorption (PSA) method, a thermal swing adsorption (TSA) method, a pressure thermal swing adsorption (PTSA) method, and a vacuum swing adsorption (VSA) method.

The oxygen generation unit may include: a first outlet port connected to the battery module to supply the separated oxygen to the battery module; and a second outlet port configured to exhaust a gas remaining after the oxygen is separated.

The air supply unit may be configured to adjust the oxygen concentration in the air supplied to the battery module by refluxing a portion of the gas exhausted through the first or second outlet port to the oxygen generation unit under control of the control unit.

The air supply unit may further include an oxygen storage unit configured to store oxygen.

The air supply unit may be configured to adjust the oxygen concentration in the air supplied to the battery module by supplying the oxygen in the oxygen storage unit to the first outlet port under control of the control unit.

The air supply unit may further include a moisture removal unit configured to remove moisture from the suctioned air.

The control unit may control the air supply unit so as to supply only moisture-removed air to the battery module by stopping an operation of the oxygen generation unit during a charging operation of the battery module.

The air supply unit may include: an air suction unit configured to suction air from the outside; a moisture removal unit configured to remove moisture from the suctioned air; and an oxygen storage unit configured to store oxygen.

The air supply unit may be further configured to adjust the oxygen concentration in the air supplied to the battery module by mixing the oxygen in the oxygen storage unit with the moisture-removed air under control of the control unit.

The electrochemical battery may include one or more metal air cells that use oxygen in air as a positive electrode active material, or one or more fuel cells that convert chemical energy of a fuel into electrical energy by an electrochemical reaction.

According to an aspect of another exemplary embodiment, a method of operating an electrochemical battery includes: supplying air to a battery module using an air supply unit, the battery module including one or more electrochemical cells; and controlling the air supply unit to adjust an oxygen concentration in the air supplied to the battery module to operate the electrochemical battery.

Also disclosed is a method of operating an electrochemical battery, the method including:
supplying air to a battery module including one or more electrochemical cells using an air supply unit; measuring an oxygen concentration in the battery module; and adjusting an oxygen concentration in the air supplied to the battery module to maintain the oxygen concentration in the battery module at a selected concentration to operate the electrochemical battery, wherein the adjusting of the oxygen concentration in the air includes increasing or decreasing an amount of a non-oxygen gas in the air.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
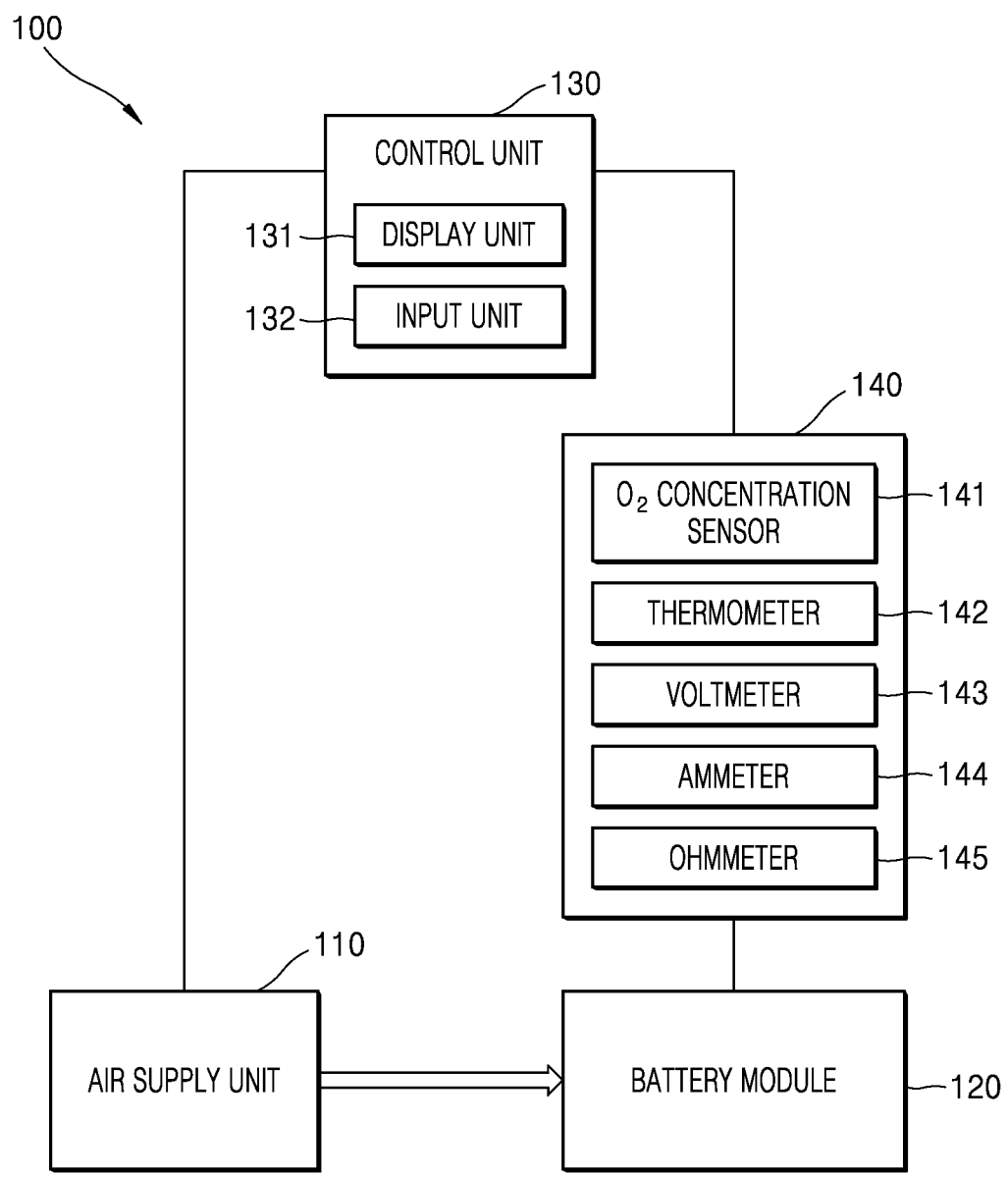
FIG. 1 is a block diagram of an electrochemical battery according to an exemplary embodiment.

Hereinafter, an electrochemical battery capable of controlling an oxygen concentration and a method of operating the electrochemical battery will be described in further detail with reference to the accompanying drawings, wherein like reference numerals refer to like elements throughout. In the drawings, the dimensions of elements are exaggerated for clarity. The following exemplary embodiments are merely exemplary, and various modifications may be made thereto. It will be understood that when an element is referred to as being "on," "connected to," or "coupled to" another element, it may be directly on, connected, or coupled to the other element, or intervening elements may be present. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram of an electrochemical battery 100 according to an exemplary embodiment. Referring to FIG. 1, the electrochemical battery 100 according to the exemplary embodiment may include a battery module 120 including a metal air cell, an air supply unit 110 configured to supply air to the battery module 120, a control unit 130 configured to control an operation of the air supply unit 110, and a sensing unit 140 including a plurality of sensors.

The battery module 120 may include, for example, one or more metal air cells that use oxygen gas as a positive electrode active material, or one or more fuel cells that convert chemical energy of a fuel into electrical energy by an electrochemical reaction. For example, in an embodiment where the battery module 120 comprises one or more metal air cells, each of the metal air cells in the battery module 120 may generate electricity by an oxidation of a metal and a reduction of oxygen. For example, when the metal is lithium (Li), the metal air cells may generate electricity through a reaction in which lithium (Li) reacts with oxygen to generate lithium oxide ($Li_2O_2$) during discharging. On charge, lithium (Li) ions may be reduced from lithium oxide and oxygen may be generated. The metal used in the electrochemical battery 100 is not limited to Li, and other metals may be used in addition to lithium (Li), and a reaction principle thereof may be substantially the same as lithium (Li). For example, the battery module 120 may include at least one selected from a sodium (Na) air cell, a zinc (Zn) air cell, a potassium (K) air cell, a calcium (Ca) air cell, a magnesium (Mg) air cell, an iron (Fe) air cell, an aluminum (Al) air cell, and an alloy air cell including at least one selected from Na, Zn, K, Ca, Mg, and Fe.

In addition, in an embodiment in which the electrochemical cell of the battery module 120 is the fuel cell, each fuel cell in the battery module 120 may generate electricity by directly converting chemical energy generated through an oxidation of a fuel into electrical energy. For example, when air including oxygen is supplied to a cathode, and a fuel such as methanol or hydrogen is supplied to an anode, an electrochemical reaction occurs through an electrolyte film between the cathode and the anode, thereby generating electricity.

As is further described above, because the battery module 120 uses oxygen during generation of electricity, it is desirable to continuously supply oxygen to the battery module 120. The supplying of oxygen to the battery module 120 may be performed by supplying air from the atmosphere (e.g. atmospheric air) to the battery module 120 or supplying oxygen to the battery module 120 from an oxygen storage unit, e.g. stored liquid oxygen. When air is supplied from the atmosphere to the battery module 120, since an oxygen concentration in the air is only 21 volume percent (%), in order to sufficiently supply oxygen to the electrochemical battery, air from the atmosphere may be compressed to a pressure of about 5 bars, and may be supplied to the battery module 120. When the high pressure compressed air is supplied to the battery module 120, the metal air cell in the battery module 120 may be mechanically abraded and damaged. In addition, since large amounts of energy are needed to compress air, the total efficiency of the electrochemical battery 100 may be reduced.

The air supply unit 110 according to the exemplary embodiment may be configured to adjust the oxygen concentration in the air supplied to the battery module 120 instead of supplying the compressed air to the battery module 120. For example, after the air supply unit 110 draws in air from the atmosphere, the air supply unit 110 may increase the oxygen concentration in the air supplied to the battery module 120 by removing moisture and nitrogen present in the air. In particular, the air supply unit 110 may be configured to improve the performance of the electrochemical battery 100 by adjusting the oxygen concentration in the air supplied to the battery module 120 according to an operation state of the battery module 120.

The control unit 130 may be configured to control an oxygen concentration adjusting operation of the air supply unit 110. For example, the control unit 130 may control the air supply unit 110 so as to maintain an oxygen concentration in the battery module 120 at a selected value, e.g., a preset specific value, or to the control unit 130 may actively adjust the oxygen concentration in the battery module 120 according to the operation state of the battery module 120. For example, the control unit 130 may control the oxygen concentration adjusting operation of the air supply unit 110 based on state parameters of the battery module 120, which are provided to the control unit 130 by the sensors of the sensing unit 140. The operation of the control unit 130 may be implemented using software or a semiconductor processor chip.

The sensing unit 140 may include various sensors configured to measure the various state parameters of the battery module 120. The state parameters refer to information received from the battery module 120 which assess the overall state of the battery module 120. For example, the sensing unit 140 may include an oxygen concentration sensor 141 configured to measure an oxygen concentration in air, a thermometer 142 configured to measure a temperature in the battery module 120, a voltmeter 143 configured to measure a voltage during a charging or discharging operation of the battery module 120, an ammeter 144 configured to measure a current output from the battery module 120, and an ohmmeter 145 configured to measure a load resistance of a load to be connected to the battery module 120. In order to monitor the state of the battery module 120, the sensing unit 140 may further include various sensors in addition to the aforementioned sensors. The sensing unit 140 may provide, to the control unit 130, the results measured by at least one sensor selected from the oxygen concentration sensor 141, the thermometer 142, the voltmeter 143, the ammeter 144, and the ohmmeter 145.

As desired, as illustrated in FIG. 1, the control unit 130 may include an input unit 132 configured to receive a user command and a display unit 131 configured to display one or more parameters measured by the sensing unit 140 or to display operational information received from the battery module 120. For example, the display unit 131 may display the oxygen concentration and temperature in the battery module 120, as well as a voltage, a current, and the number of times of charging and discharging of the metal air cell. The display unit may also provide information for the maintenance of the electrochemical battery 100 to a user. The control unit 130 may be operated by the user through commands entered into the input unit 132. For example, the user may select the range of an oxygen concentration or an operation mode of the electrochemical battery 100 through the input unit 132. In that case, the control unit 130 may control the air supply unit 110 so as to constantly maintain the oxygen concentration in the battery module 120 at a selected concentration, e.g., a concentration input through the input unit 132. Alternatively, the control unit 130 may intermittently or variably control the air supply unit 110 so as to maintain the oxygen concentration in the battery module 120 at a selected concentration, e.g., a concentration input through the input unit 132.

Also, according to the need, the control unit 130 may further include a communication module (not illustrated). The communication module may be connected to a wired or wireless network and configured to transmit information about an operation state of the control unit 130 or state parameters of the battery module 120 and receive a user command. Therefore, a manager or a user may monitor the state of the electrochemical battery 100 and input commands through the communication module at a remote place.

Figure 2:
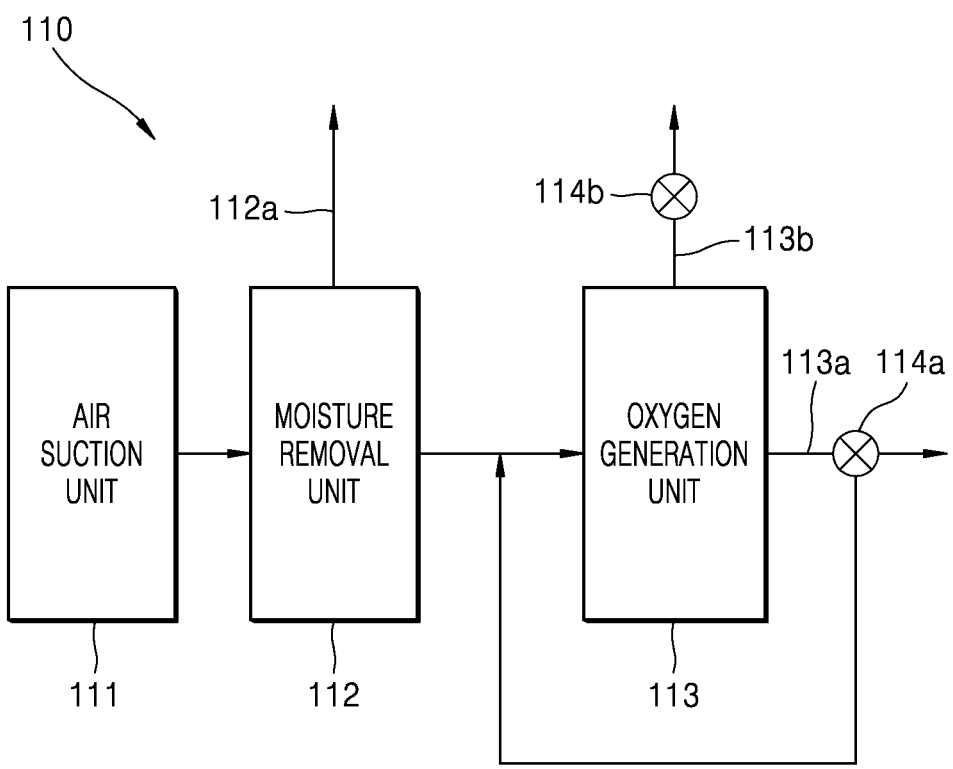
FIG. 2 is a block diagram of an air supply unit of the electrochemical battery illustrated in FIG. 1, according to an exemplary embodiment.

FIG. 2 is a block diagram of an air supply unit 110 configured to adjust an oxygen concentration of the electrochemical battery 100 illustrated in FIG. 1, according to an exemplary embodiment. Referring to FIG. 2, the air supply unit 110 may include an air suction unit 111 configured to suction air from the outside, a moisture removal unit 112 configured to remove moisture from the suctioned air, and an oxygen generation unit 113 to configured to generate oxygen by separating oxygen from the suctioned air. The air suction unit 111 may be configured to adjust an amount of air suctioned from outside of the air supply unit 110, under the control of the control unit 130. The moisture removal unit 112 is illustrated in FIG. 2 as being disposed upstream of, e.g., in front of, the oxygen generation unit 113 in an air flow direction, but a placement order thereof may be changed between the moisture removal unit 112 and the oxygen generation unit 113. For example, the oxygen generation unit 113 may be disposed upstream of, e.g., in front of, the moisture removal unit 112 in the air flow direction. In addition, the moisture removal unit 112 and the oxygen generation unit 113 may be integrated together to provide a single configuration. Hereinafter, for convenience, the embodiment wherein the moisture removal unit 112 is disposed in front of the oxygen generation unit 113 will be further described.

The moisture removal unit 112 may be configured to remove moisture from outside air suctioned by the air suction unit 111. In an embodiment in which the electrochemical cell of the battery module 120 is the metal air cell, when moisture is present in air, lithium hydroxide may be generated when the metal air cells are discharged, and accordingly, an energy density of the electrochemical battery 100 may be reduced and a battery life thereof may be shortened. In this regard, the moisture removal unit 112 may be alternatively referred to as an air drier. Although not illustrated in detail, the moisture removal unit 112 may include, for example, an adsorption unit configured to adsorb moisture in air and a heating unit configured to heat the adsorption unit and desorb the moisture adsorbed to the adsorption unit. The moisture desorbed from the adsorption unit may be exhausted to the outside through a moisture outlet port 112a.

However, in an embodiment in which the electrochemical cell of the battery module 120 is the fuel cell, the moisture removal unit 112 may be omitted from the air supply unit 110.

Air dried by the moisture removal unit 112 may be supplied to the oxygen generation unit 113. The oxygen generation unit 113 may increase an oxygen concentration in air by removing a non-oxygen gas, such as carbon dioxide and nitrogen which are present in the dried air. For example, the oxygen generation unit 113 may be configured to filter oxygen via an adsorption/desorption method or a membrane method. The oxygen, which is filtered by the oxygen generation unit 113 via the adsorption/desorption method or the membrane method, may be supplied to the battery module 120 through a first outlet port 113a. To this end, the first outlet port 113a may be disposed between the oxygen generation unit 113 and the battery module 120. A gas remaining after oxygen is separated, e.g., oxygen-depleted air, may be exhausted to the outside through a second outlet port 113b.

As illustrated in FIG. 2, in order to facilitate adjustment of the oxygen concentration to a desired concentration, the gas, which is exhausted through the first or second outlet port 113a or 113b, may be refluxed to the oxygen generation unit 113. For example, a portion of the air, which is supplied from the first outlet port 113a to the battery module 120, may be refluxed to the oxygen generation unit 113. To this end, a first valve 114a may be disposed at a branch point of a reflux path, which is connected to the oxygen generation unit 113 through the first outlet port 113a. The control unit 130 may control the first valve 114a to adjust an amount of the air which is refluxed from the first outlet port 113a to the oxygen generation unit 113. In a similar manner, a portion of the air, which is exhausted through the second outlet port 113b, may be refluxed from the second outlet port 113b to the oxygen generation unit 113. To this end, a second valve 114b may be disposed at a branch point of a reflux path, which is connected to the oxygen generation unit 113 through the second outlet port 113b. The control unit 130 may control the second valve 114b to adjust an amount of the air refluxed from the second outlet port 113b to the oxygen generation unit 113.

Figure 3:
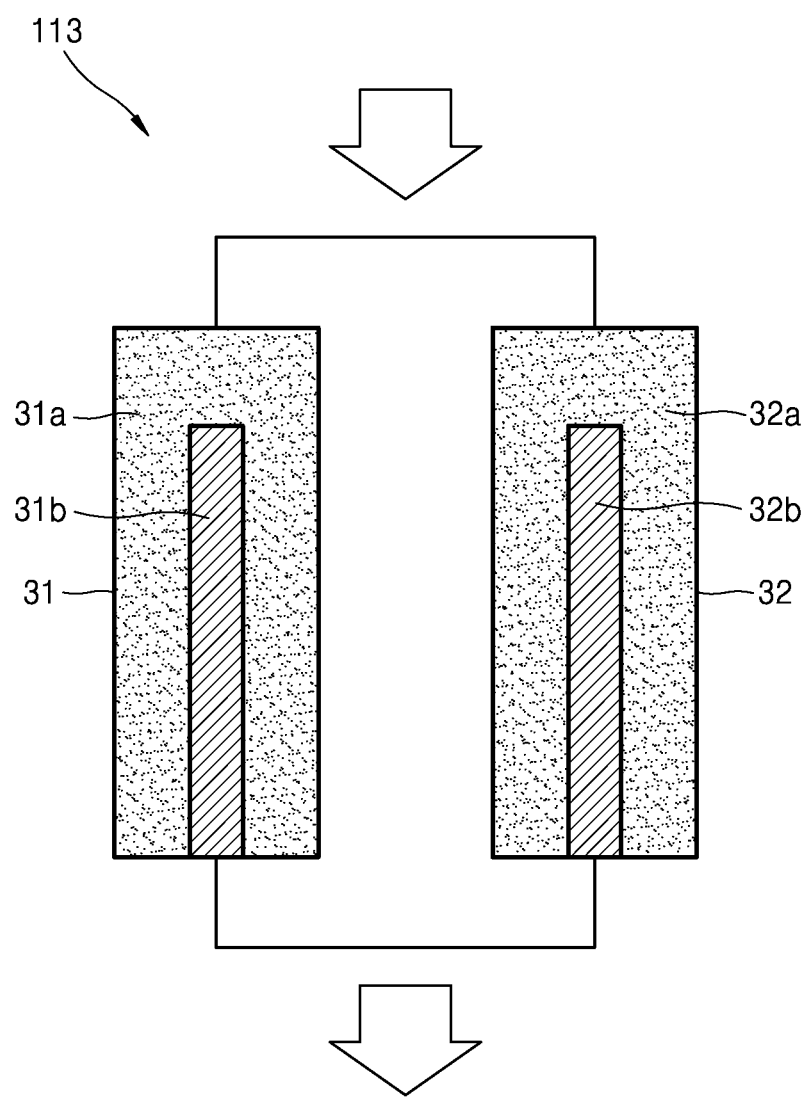
FIG. 3 is a diagram of an oxygen generation unit of the air supply unit illustrated in FIG. 2, according to an exemplary embodiment.

FIG. 3 is a diagram of an oxygen generation unit 113 of the air supply unit 110 illustrated in FIG. 2, according to an exemplary embodiment. The oxygen generation unit 113 illustrated in FIG. 3 may be configured to filter oxygen via an adsorption/desorption method. In this case, the air supply unit 110 may adjust the oxygen concentration in the air supplied to the battery module 120 by adjusting an amount of nitrogen adsorbed from the air under the control of the control unit 130. For example, referring to FIG. 3, the oxygen generation unit 113 may include a first adsorption unit 31 and a second adsorption unit 32, which are disposed in parallel to each other. The first adsorption unit 31 may include a first adsorbent 31a and a first recycling unit 31b, and the second adsorption unit 32 may include a second adsorbent 32a and a second recycling unit 32b.

The first and second adsorbents 31a and 32a may function to adsorb impurities such as nitrogen present in the air. For example, the first and second adsorbents 31a and 32a may include at least one selected from zeolite LiX, alumina, a metal-organic framework (MOF), and a zeolite imidazolate framework (ZIF). The MOF may include a metal ion or a metal cluster which is coordinated to an organic molecule and may comprise a crystalline compound forming a primary, secondary, or tertiary porous structure. In addition, the ZIF may comprise a nanoporous compound including a tetrahedral cluster of the formula $MN_4$ that is linked by an imidazolate ligand, wherein M is a metal, such as a metal of Groups 3 to 13, or of Groups 3 to 12 of the Periodic Table of the Elements.

The first and second recycling units 31b and 32b may function to recycle the saturated first and second adsorbents 31a and 32a. In order to recycle the saturated first and second adsorbents 31a and 32a, each of the first and second recycling units 31b and 32b may be configured to be capable of adjusting an internal pressure and an internal temperature of each of the respective first and second adsorption units 31 and 32.

The oxygen generation unit 113 having the aforementioned structure may operate via a pressure swing adsorption (PSA) method. For example, a non-oxygen gas such as nitrogen may be adsorbed to the first adsorbent 31a by increasing the internal pressure of the first adsorption unit 31. The remaining air, e.g. air from which the non-oxygen gas has been removed and having an increased oxygen concentration, may be exhausted from the first adsorption unit 31 to the first outlet port 113a. Also, the nitrogen adsorbed to the second adsorbent 32a may be desorbed from the second adsorbent 32a by decreasing the internal pressure of the second adsorption unit 32, and the desorbed nitrogen may be exhausted from the second adsorption unit 32 to the second outlet port 113b. When the first adsorbent 31a is saturated, the internal pressure of the first adsorption unit 31 may be decreased, and the internal pressure of the second adsorption unit 32 may be increased. In this case, a desorbing operation may be performed in the first adsorption unit 31, and an adsorbing operation may be performed in the second adsorption unit 32. In such a manner, the first and second adsorption units 31 and 32 may alternately swing between adsorption and desorption. Accordingly, the oxygen concentration in the air supplied to the battery module 120 may be selected by adjusting the internal pressure of each of the first and second adsorption units 31 and 32.

However, an operation manner of the oxygen generation unit 113 is not limited to the PSA method. For example, in addition to the PSA method, the oxygen generation unit 113 may be configured to operate by at least one selected from a thermal swing adsorption (TSA) method, a pressure thermal swing adsorption (PTSA) method, and a vacuum swing adsorption (VSA) method. The PSA method refers to a technology of primarily adsorbing or capturing a specific gas, (e.g., a non-oxygen gas, or an impurity,] using the first and second adsorbents 31a and 32a at a high partial pressure, and desorbing or exhausting the specific gas when the partial pressure is decreased. The TSA method refers to a technology of primarily adsorbing or capturing a specific gas to the first and second adsorbents 31a and 32a at room temperature, and desorbing or exhausting the specific gas when the temperature is increased. The PTSA method refers to a technology in which the PSA method and the TSA method are combined. The VSA refers to a technology of primarily adsorbing or capturing a specific gas to the first and second adsorbents 31a and 32a at a pressure in the vicinity of an atmospheric pressure, and desorbing or exhausting the specific gas using a vacuum.

Figure 4:
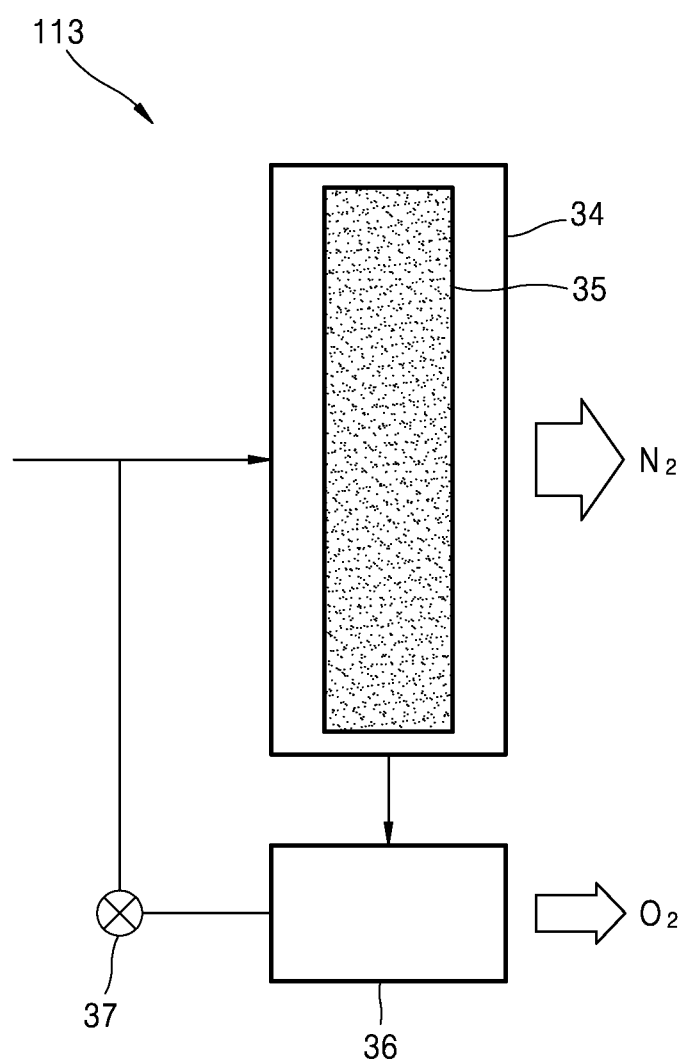
FIG. 4 is a diagram of an oxygen generation unit of the air supply unit illustrated in FIG. 2, according to another exemplary embodiment.

FIG. 4 is a diagram of an oxygen generation unit 113 of the air supply unit 110 illustrated in FIG. 2 according to another exemplary embodiment. The oxygen generation unit 113 illustrated in FIG. 4 may be configured to filter oxygen using a membrane method. Referring to FIG. 4, the oxygen generation unit 113 may include a pump 36 and an oxygen separation module 34 which are configured to separate nitrogen and oxygen from air. A membrane 35 may be disposed in the oxygen separation module 34 to selectively separate oxygen. In FIG. 4 a single membrane 35 is illustrated for convenience, but a plurality of membranes may be disposed in a multi-layered structure. For example, the membrane 35 may include a compound such as $Ba_{0.5}Sr_{0.5}Co_{0.8}Fe_{0.2}O_{3-\delta}$ (BSCF oxide).

The air dried by the moisture removal unit 112 may be supplied to the oxygen separation module 34, and the membrane 35 in the oxygen separation module 34 may filter oxygen in the air. As desired, in order to improve separation efficiency by supplying a sufficient amount of air to the oxygen separation module 34, an air compressor (not shown) may be further disposed between the moisture removal unit 112 and the oxygen separation module 34. A gas, e.g., nitrogen, remaining after oxygen is separated in the oxygen separation module 34 may be exhausted to the outside of the oxygen separation module 34 through the second outlet port 113b. A pump 36 may be used to supply oxygen from the first outlet port 113a to the battery module 120 by pumping oxygen emitted from the oxygen separation module 34 through the first outlet port 113a and toward the battery module 120. Also, in order to adjust the oxygen concentration in the air supplied to the battery module 120, a portion of the air dried by the moisture removal unit 112 may be mixed with oxygen emitted from the pump 36. For example, a valve 37 may be disposed between the moisture removal unit 112 and the pump 36, and the control unit 130 may control the valve 37 so as to adjust the oxygen concentration in the air supplied to the battery module 120.

Figure 5:
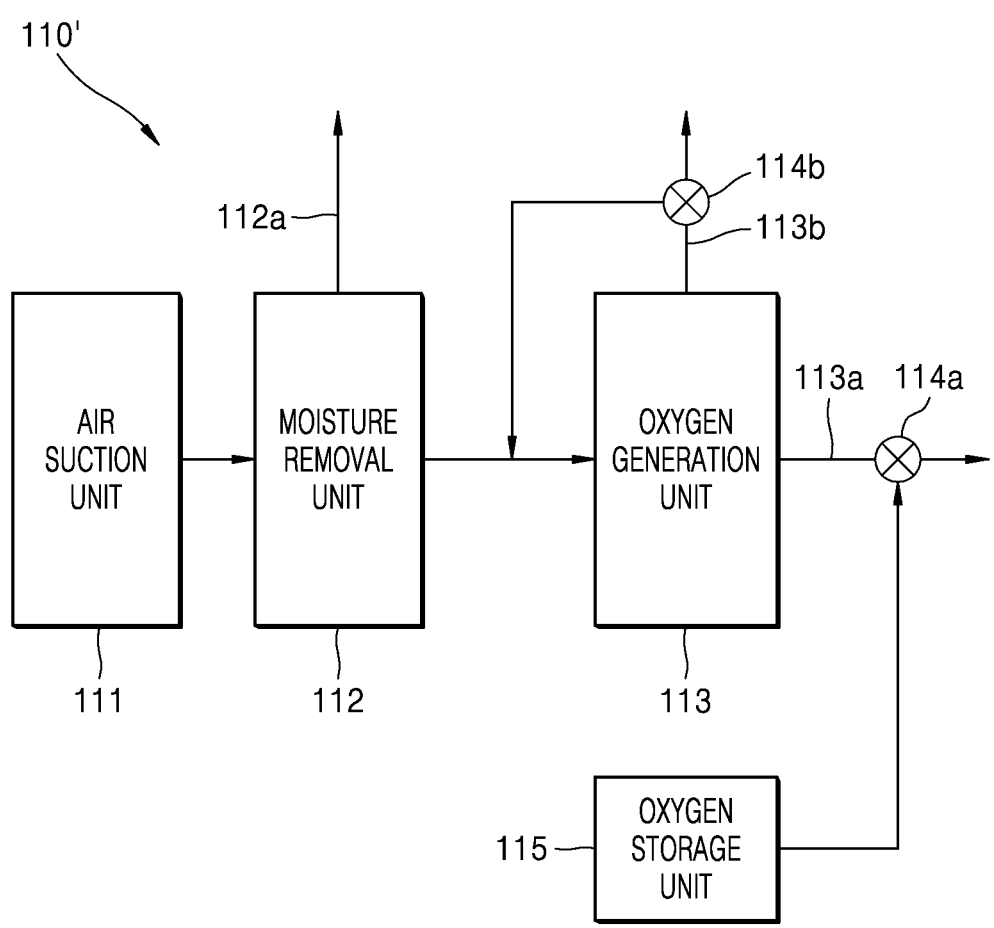
FIG. 5 is a block diagram of an air supply unit of the electrochemical battery illustrated in FIG. 1, according to another exemplary embodiment.

FIG. 5 is a block diagram of an air supply unit 110' of the electrochemical battery 100 illustrated in FIG. 1, according to another exemplary embodiment. Referring to FIG. 5, the air supply unit 110' may further include an oxygen storage unit 115 configured to store pure oxygen in a liquid state. The oxygen storage unit 115 may be connected to the first outlet port 113a through a first valve 114a. When an oxygen concentration in air supplied from an oxygen generation unit 113 is insufficient, the control unit 130 may control the first valve 114a to mix oxygen from the oxygen storage unit 115 with the air supplied from the oxygen generation unit 113 and thereby increase the concentration of oxygen supplied to the battery module 120.

The oxygen storage unit 115 may be used with or instead of the oxygen generation unit 113. For example, the air supply unit 110' may include an air suction unit 111, a moisture removal unit 112, and the oxygen storage unit 115 and not include the oxygen generation unit 113. In this case, the oxygen in the oxygen storage unit 115 may be mixed with air dried by the moisture removal unit 112. The control unit 130 may adjust the oxygen concentration in the air supplied from the air supply unit 110' to the battery module 120 by adjusting an amount of the oxygen from the oxygen storage unit 115, which is mixed with the dried air.

As described above, in the electrochemical battery 100 according to the exemplary embodiment, the control unit 130 and the air supply unit 110' may be configured to adjust the oxygen concentration in the battery module 120 to a desired concentration. Hereinafter, an oxygen concentration will be described which can provide improved operation of the electrochemical battery 100. For example, FIGS. 6 to 9 are graphs showing a change in performance of the electrochemical battery 100 according to an oxygen concentration in the air supplied to the battery module 120, for example, in an embodiment in which the electrochemical cell of the battery module 120 is the metal air cell.

Figure 6:
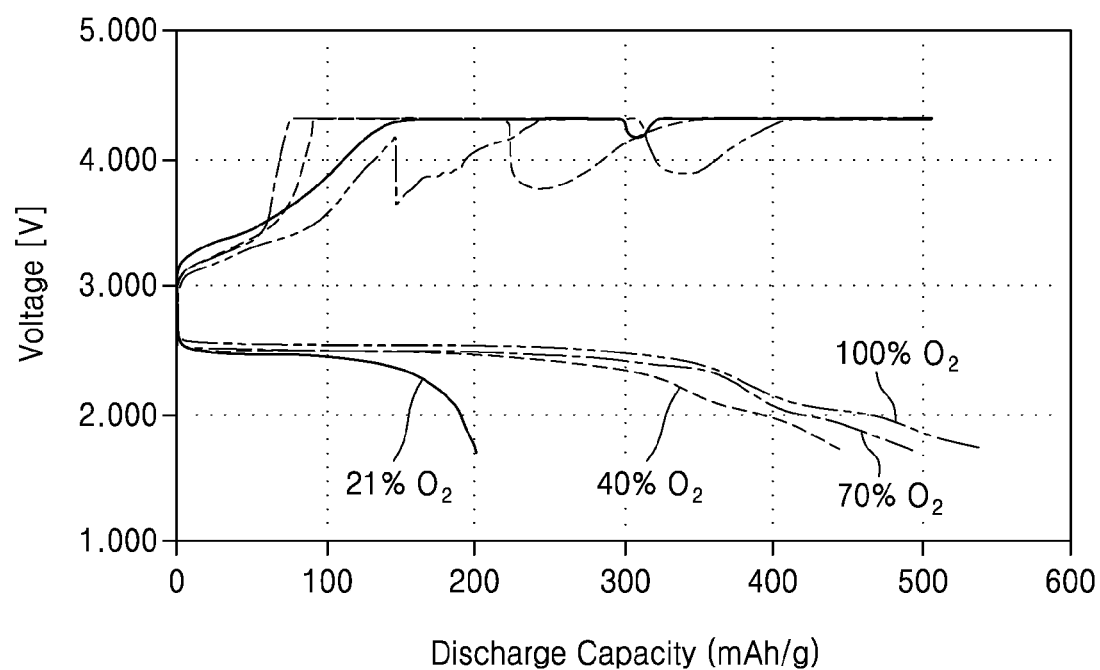
FIG. 6 is a graph of voltage (volts, V) versus discharge capacity (milliampere hour per gram, mAh/g) showing charging and discharging performance of a electrochemical battery according to an oxygen concentration, in a case where the electrochemical battery is a metal air battery.

FIG. 6 is a graph showing charging and discharging performance of the electrochemical battery 100 according to an oxygen concentration (21 volume percent (%), 40%, 70%, and 100%), for example, in an embodiment in which the electrochemical cell of the battery module 120 is the metal air cell. In the graph of FIG. 6, a lithium metal was used as an anode. An energy density was maintained at about 0.24 milliampere-hours per square centimeter (mAh/cm$^2$) during discharging, and discharging was performed until a voltage was dropped to about 1.7 volts (V). In addition, an applied voltage was about 4.3 V during charge. Referring to the graph of FIG. 6, when the voltage was greater than about 1.7 V, and when the oxygen concentration was about 100%, a discharge capacity was the greatest at about 550 milliampere-hours per gram (mAh/g). When the oxygen concentration was about 21%, the discharge capacity was the least at about 200 mAh/g. The discharge capacity increased in order from an oxygen concentration of about 40% to an oxygen concentration of about 70%. The discharge capacity at the oxygen concentration of 40% was about 80% of the discharge capacity at the oxygen concentration of about 100%, and the discharge capacity at the oxygen concentration of about 70% was not significantly different from the discharge capacity at the oxygen concentration of about 100%.

Figure 7:
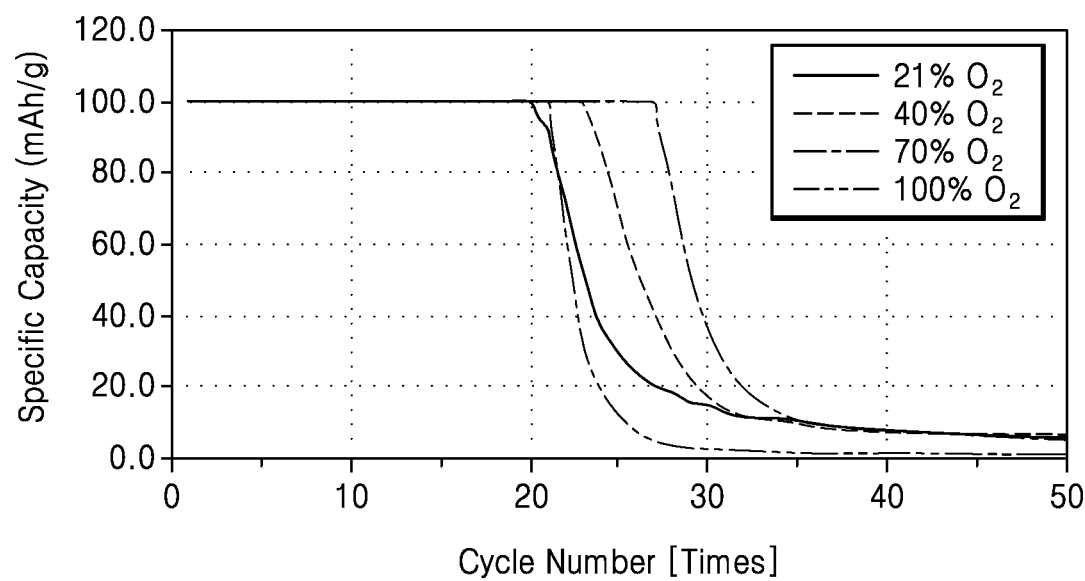
FIGS. 7 and 8 are graphs of specific capacity (mAh/g) versus cycle number (times) showing charging performance and discharging performance of a electrochemical battery according to an oxygen concentration, in a case where the electrochemical battery is a metal air battery.

FIG. 7 is a graph showing the effect of oxygen concentration (21%, 40%, 70%, and 100%) on the number of charge and discharge cycles of the electrochemical battery 100 according to an oxygen concentration, for example, in an embodiment in which the electrochemical cell of the battery module 120 is the metal air cell. In the graph of FIG. 7, lithium metal was used as an anode. An energy density was maintained at about 0.24 milliampere-hours per square centimeter (mAh/cm$^2$) during discharge, and discharging was performed until a voltage was dropped to about 1.7 V. In addition, an applied voltage was about 4.3 V during charge. It was shown that after multiple charging and discharging cycles were repeated when a discharge capacity was maintained at about 100 mAh/g, the number of charge and discharge cycles reached at an oxygen concentration of about 21% was similar to the number of charge and discharge cycles reached at an oxygen concentration of about 100%. It was also shown that after charging and discharging were performed about 20 times, performance degradation of the electrochemical battery occurred at the oxygen concentrations of about 21% and about 100%. The number of charge and discharge cycles was greatest when the oxygen concentration was about 70%.

Figure 8:
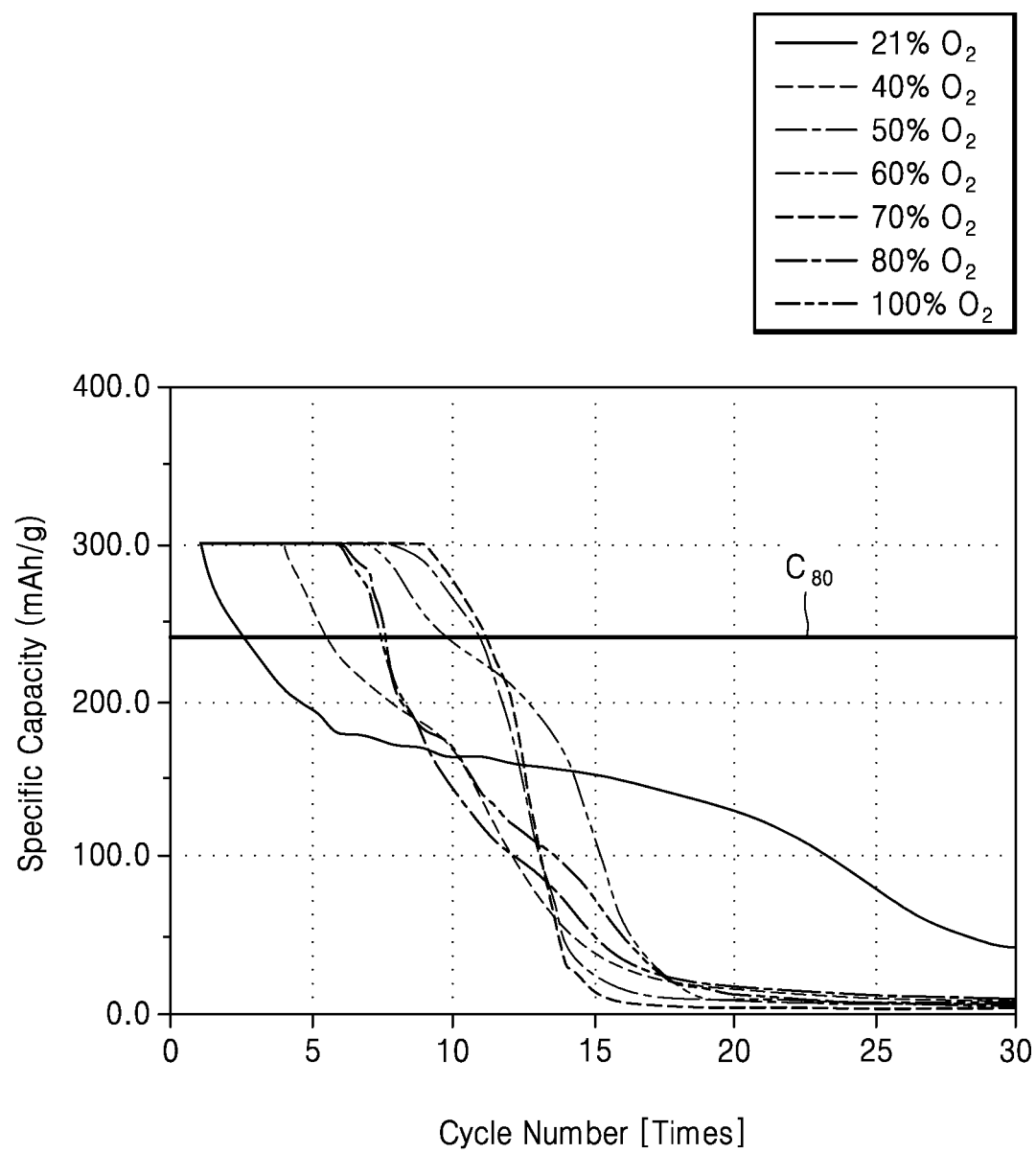

FIG. 8 is a graph showing the effect of oxygen concentration (21%, 40%, 50%, 60%, 70%, 80%, and 100%) on the number of charge and discharge cycles of the electrochemical battery 100 according to an oxygen concentration, when charging and discharging cycles were repeated when the capacity was maintained at about 300 mAh/g, for example, in an embodiment in which the electrochemical cell of the battery module 120 is the metal air cell. When the specific capacity reached a level of about 80% of an initial specific capacity, that is, 240 mAh/g, the number of charging and discharging cycles was the best at oxygen concentrations of about 50% and about 70%. When the oxygen concentration was about 21%, the discharge capacity of about 300 mAh/g was recorded only once, and the discharge capacity was reduced from a second charge and discharge cycle. A specific capacity at oxygen concentrations of about 80% and about 100% reached a level of about 80% of an initial specific capacity from the seventh charge and discharge cycle.

Figure 9:
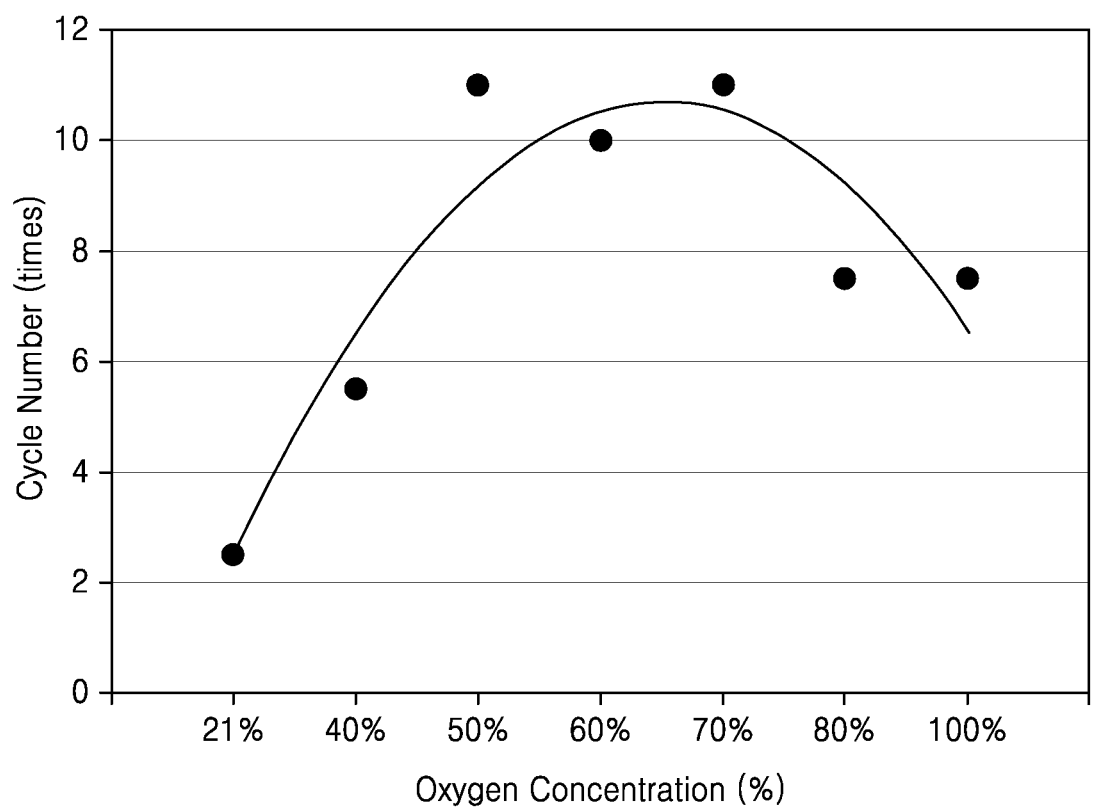
FIG. 9 is a graph of cycle number (times) versus oxygen concentration (volume percent, %) showing the relationship between an oxygen concentration and the number of charging and discharging cycles when a specific capacity of the electrochemical battery reaches a level of about 80% of an initial specific capacity of a electrochemical battery according to an exemplary embodiment, in a case where the electrochemical battery is a metal air battery.

FIG. 9 is a graph showing the relationship between an oxygen concentration and the number of charging and discharging cycles at a specific capacity of about 80% of an initial specific capacity of the electrochemical battery 100 in the results of FIG. 8. Referring to FIG. 9, it was shown that when an oxygen concentration was in the range of about 50% to about 70%, the number of charging and discharging cycles was the greatest, and when the oxygen concentration was greater or less than the range of about 50% to about 70%, the number of charging and discharging cycles was reduced.

From the above described results, when the oxygen concentration is about 100%, discharge efficiency of the electrochemical battery 100 may be temporarily improved, but as the charging and discharging cycles are repeated, degradation of the electrochemical battery 100 is rapidly accelerated. Without being limited by theory, it is believed that the degradation may occur because an electrode, an electrolyte, and the like are easily oxidized due to the presence of excess oxygen. Therefore, when 100% oxygen is supplied to the electrochemical battery 100, a battery life of the electrochemical battery 100 may be shortened. In addition, when the oxygen concentration is about 21%, the performance of the electrochemical battery 100 was reduced in terms of the discharge efficiency and the number of charging and discharging cycles.

As can be seen from the above, in order to improve the performance and the battery life of the electrochemical battery 100, the electrochemical battery 100 may operate at an oxygen concentration that is greater than about 21% and less than about 100%. For example, the control unit 130 may adjust the oxygen concentration in the air supplied to the battery module 120 of the electrochemical battery 100 to be within the range of a value equal to or greater than about 30% and a value less than about 100%. More specifically, the control unit 130 may adjust the oxygen concentration in the air supplied to the battery module 120 to be within the range of a value equal to or greater than about 35% and a value less than about 95%, about 40% to about 93%, in the range of about 50% to about 80%, or about 55% to about 75%, based on the desired parameters of the battery module 120.

Although an embodiment in which the electrochemical cell of the battery module 120 is the metal air cell has been described with reference to FIGS. 6 to 9, it may be advantageous to adjust the oxygen concentration in the air supplied to the battery module 120 in an appropriate range even when the electrochemical cell of the battery module 120 is the fuel cell.

The control unit 130 may operate based on a mode preset by the manufacturer in the software or hardware or according to the user's command input through the input unit 132.

For example, the simplest control method is a feedforward control method that does not consider the state of the battery module 120. The oxygen concentration in the air supplied by the air supply unit 110 may be fixed at a specific value, and the control unit 130 may be used to control the air supply unit 110 so that the supplied air has a specific oxygen concentration regardless of an actual oxygen concentration in the battery module 120. In this case, the electrochemical battery 100 may not include the sensing unit 140. The oxygen concentration sensor 141 may be disposed only in the first outlet port 113*a*, which functions as an air passage between the air supply unit 110 and the battery module 120. In this case, when an oxygen concentration in the first outlet port 113*a* is less than a preset concentration, the control unit 130 may control the air supply unit 110 so as to increase the oxygen concentration, and when the oxygen concentration in the first outlet port 113*a* is greater than the preset concentration, the control unit 130 may control the air supply unit 110 so as to decrease the oxygen concentration.

The control unit 130 may control the air supply unit 110 in a feedback method, which takes into consideration the state of the battery module 120. For example, the control unit 130 may control the air supply unit 110 so as to constantly maintain the oxygen concentration in the battery module 120 at a selected, e.g., preset, concentration range by sensing the oxygen concentration in the battery module 120. In this case, the oxygen concentration sensor 141 may be disposed in the battery module 120. When the oxygen concentration in the battery module 120 is less than the selected concentration, the control unit 130 may control the air supply unit 110 so as to increase the oxygen concentration in the air supplied to the battery module 120. In addition, when the oxygen concentration in the battery module 120 is greater than the selected concentration, the control unit 130 may control the air supply unit 110 so as to decrease the oxygen concentration in the air supplied to the battery module 120. For example, the control unit 130 may control the air supply unit 110 so as to constantly maintain the oxygen concentration in the air supplied to the battery module 120 at a specific selected concentration in the range of a value equal to or greater than about 30% and a value less than about 100%, or in the range of a value equal to or greater than about 35% and a value less than about 95%, or in the range of about 50% and about 80%.

In addition, the control unit 130 may perform a feedback control based on other state parameters as well as the oxygen concentration in the battery module 120. That is, the control unit 130 may sense an overall state (e.g. status) of the battery module 120 and may control the air supply unit 110 so as to intermittently, e.g., variably, adjust the oxygen concentration in the air supplied to the battery module 120 according to the sensed state. For example, the oxygen concentration in the battery module 120 may be increased or decreased based on various parameters, such as a temperature in the battery module 120, a voltage of the battery module 120, a current output from the battery module 120, and a load resistance of a load to be connected to the battery module 120, each of which may be measured by the sensing unit 140. When the voltage of the battery module 120 is less than a selected, e.g., preset, voltage during discharge, in order to improve the efficiency of the battery module 120, the control unit 130 may control the air supply unit 110 so as to increase the oxygen concentration in the air supplied to the battery module 120. In addition, when the temperature in the battery module 120 deviates from a selected, e.g., preset, temperature range, the current output from the battery module 120 is greater than a selected, e.g., preset, current, and the load resistance of a load to be connected to the battery module is increased, the oxygen concentration in the air may be increased. Similarly, when the current output from the battery module 120 is less than a selected current, and the load resistance of the electrochemical battery 100 may be decreased, the oxygen concentration in the air may be decreased.

Figure 10:
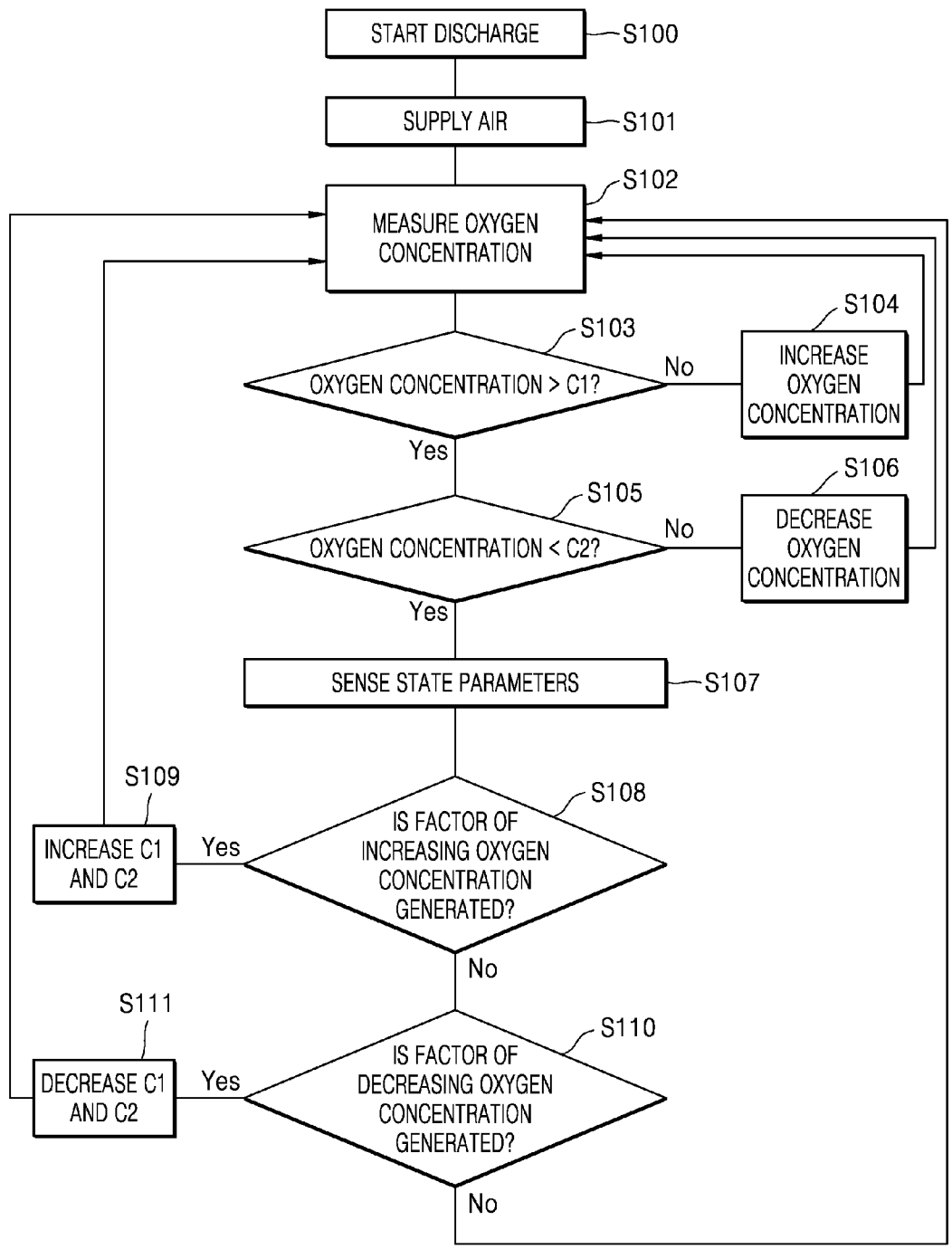
FIG. 10 is a flowchart of a method of operating a electrochemical battery, according to an exemplary embodiment.

FIG. 10 is a flowchart of a method of operating a electrochemical battery 100, according to an exemplary embodiment. When the aforementioned feedback method is simply described with reference to a flowchart, the feedback method may be substantially the same as shown in FIG. 10. Referring to FIG. 10, when a discharging operation (or electricity generation operation) of the electrochemical battery 100 is started (S100), a control unit 130 may control an air supply unit 110 so as to initiate flow of a supply air to a battery module 120 (S101). While the air is supplied to the battery module 120, an oxygen concentration sensor 141 may measure an oxygen concentration in the battery module 120 and may provide the measured oxygen concentration to the control unit 130 (S102). The control unit 130 may compare the oxygen concentration measured by the oxygen concentration sensor 141 with a lower limit value C1 of a preset oxygen concentration range (S103). When the oxygen concentration measured by the oxygen concentration sensor 141 is less than the lower limit value C1 of the selected, e.g., preset, oxygen concentration range, the control unit 130 may control the air supply unit 110 so as to increase the oxygen concentration (S104). When the oxygen concentration measured by the oxygen concentration sensor 141 is greater than the lower limit value C1 of the preset oxygen concentration range, the control unit 130 may compare the oxygen concentration measured by the oxygen concentration sensor 141 with an upper limit value C2 of the preset oxygen concentration range (S105). When the oxygen concentration measured by the oxygen concentration sensor 141 is greater than the upper limit value C2 of the preset oxygen concentration range, the control unit 130 may control the air supply unit 110 so as to decrease the oxygen concentration (S106). Operations S102 to S106 may be repeated until the oxygen concentration measured by the oxygen concentration sensor 141 is within the preset oxygen concentration range (C1 to C2).

The sensing unit 140 may sense other state parameters of the battery module 120 in addition to the oxygen concentration (S107). For convenience, operation S107 of sensing the state parameters is illustrated in the flowchart of FIG. 10 as occurring after operation S102 of measuring the oxygen concentration, but is not limited thereto. For example, operation S107 of sensing the state parameters may be performed prior to operation S102 of measuring the oxygen concentration, or operation S107 and operation S102 may be performed concurrently.

The control unit 130 may determine whether a factor of increasing the oxygen concentration exists (S108), based on the state parameters sensed in operation S107. For example, when a discharge voltage of the battery module 120 is less than a selected, e.g., preset, voltage, a temperature in the battery module 120 may deviate from a selected temperature range, a current output from the battery module 120 may be greater than a selected current, and/or a load resistance of a load to be connected to the electrochemical battery 100 may be greater than a preset load resistance, the control unit 130 may increase the lower limit value C1 and the upper limit value C2 of the oxygen concentration range, respectively (S109). The oxygen concentration in the battery module 120 may be re-measured (S102) to assess whether to increase the oxygen concentration in the battery module 120.

The control unit 130 may also determine whether a factor of decreasing the oxygen concentration exists (S110), based on the state parameters sensed in operation S107. For example, when the discharge voltage of the battery module 120 is greater than the selected voltage, the temperature in the battery module 120 is in the selected temperature range, the current output from the battery module 120 is less than the selected current, and/or the load resistance of a load to be connected to the battery module is less than the selected load resistance, the control unit 130 may decrease the lower limit value C1 and the upper limit value C2 of the oxygen concentration range, respectively (S111). The oxygen concentration in the battery module 120 may be re-measured (S102) to assess whether to decrease the oxygen concentration in the battery module 120.

When the electrochemical battery 100 performs a charging operation, the battery module 120 supply of oxygen can be omitted, and oxygen may instead be generated in the battery module 120. Accordingly, under these conditions, supply of oxygen to the battery module 120 by the air supply unit can be omitted. Rather, the oxygen concentration in the battery module 120 may be decreased. Therefore, in this case, the control unit 130 may operate only a moisture removal unit 112 of the air supply unit 110 and may stop an operation of an oxygen generation unit 113. In that case, only moisture-removed air may be supplied to the battery module 120. At this time, an oxygen concentration in the air supplied to the battery module may be a concentration of about 21% which is equal to an oxygen concentration in the atmosphere.

The control unit 130 configured to perform the operations described with reference to FIG. 10 may be embodied in the form of software executable on a computer. For example, the software that realizes the above-described functions may be stored as computer-readable code on a non-transitory computer-readable recording medium. The computer-readable recording medium is any data storage device. Examples of the non-transitory computer-readable recording medium may include read-only memory (ROM), random-access memory (RAM), compact disk-ROMs (CD-ROMs), magnetic tapes, floppy disks, and optical data storage devices. The non-transitory computer readable recording medium can also be distributed via a wired or wireless network. When necessary, the software may be implemented so that information about the operation state of the control unit 130 or the state parameters of the battery module 120 is transmitted or received. Also, the control unit 130 may include hardware dedicated to executing the software that performs the operations described with reference to FIG. 10. For example, the control unit 130 may include an electronic circuit or a microprocessor dedicated to executing the software.

To aid understanding of this disclosure, exemplary embodiments of the electrochemical battery capable of controlling the oxygen concentration and the method of operating the electrochemical battery have been described and illustrated in the accompanying drawings. However, it will be understood that the exemplary embodiments are examples shall not limit the scope of this disclosure. It will be understood that this disclosure is not limited to the illustrations and description presented herein. Various modifications may be made by those of skill in the art.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrochemical battery comprising:
   a battery module comprising one or more electrochemical cells;
   an air supply unit configured to supply air to the battery module and to adjust an oxygen concentration in the air supplied to the battery module; and
   a control unit configured to control an oxygen concentration adjusting operation of the air supply unit,
   wherein the control unit is configured to control the air supply unit to variably adjust the oxygen concentration in the air supplied to the battery module, or
   wherein the control unit is configured to maintain the oxygen concentration in air supplied to the battery module at a selected concentration, according to a state of the battery module, and
   wherein the control unit is configured to control the air supply unit to constantly maintain the oxygen concentration in the air supplied to the battery module in a range of about 30 volume percent to less than about 100 volume percent, based on a total content of the air supplied to the battery module.

2. The electrochemical battery of claim 1, wherein the air supply unit is configured to adjust the oxygen concentration in the air supplied to the battery module by adjusting an amount of nitrogen absorbed from the air, and
   wherein the air supply unit is controlled by the control unit.

3. The electrochemical battery of claim 1, wherein,
   when the oxygen concentration is less than the selected concentration, the control unit is configured to control the air supply unit to increase the oxygen concentration in the air supplied to the battery module, and
   when the oxygen concentration is greater than the selected concentration, the control unit is configured to control the air supply unit to decrease the oxygen concentration in the air supplied to the battery module.

4. The electrochemical battery of claim 1, wherein the control unit is configured to control the air supply unit to constantly maintain the oxygen concentration in the air supplied to the battery module in a range of about 50 volume percent to about 70 volume percent, based on a total content of the air supplied to the battery module.

5. The electrochemical battery of claim 1, further comprising a sensing unit configured to measure at least one parameter selected from an oxygen concentration in the battery module, a temperature in the battery module, a voltage of the battery module, a current output of the battery module, and a load resistance of a load to be connected to the battery module.

6. The electrochemical battery of claim 5, wherein the control unit is configured to control the air supply unit to adjust the oxygen concentration in the air supplied to the battery module based on the at least one parameter measured by the sensing unit.

7. The electrochemical battery of claim 6, wherein the control unit is configured to control the air supply unit to increase the oxygen concentration in the air supplied to the battery module when the voltage of the battery module is less than a selected voltage during a discharging operation of the battery module.

8. The electrochemical battery of claim 1, wherein the air supply unit comprises:
an air suction unit configured to suction air from outside of the air supply unit;
a moisture removal unit configured to remove moisture from the suctioned air and provide moisture-removed air; and
an oxygen storage unit configured to store oxygen,
wherein the air supply unit is further configured to adjust the oxygen concentration in the air supplied to the battery module by mixing the oxygen from the oxygen storage unit with the moisture-removed air, and
wherein the air supply unit is controlled by the control unit.

9. The electrochemical battery of claim 1, wherein the battery module comprises one or more metal air cells that use oxygen in air as a positive electrode active material, or one or more fuel cells that convert chemical energy of a fuel into electrical energy by an electrochemical reaction.

10. An electrochemical battery comprising,
a battery module comprising one or more electrochemical cells;
an air supply unit configured to supply air to the battery module and to adjust an oxygen concentration in the air supplied to the battery module; and
a control unit configured to control an oxygen concentration adjusting operation of the air supply unit,
wherein the air supply unit comprises:
an air suction unit configured to suction air from outside of the air supply unit; and
an oxygen generation unit configured to generate oxygen by separating oxygen from the suctioned air.

11. The electrochemical battery of claim 10, wherein the oxygen generation unit is configured to filter oxygen via an adsorption/desorption method or via a membrane method.

12. The electrochemical battery of claim 11, wherein the adsorption/desorption method is at least one selected from a pressure swing adsorption method, a thermal swing adsorption method, a pressure thermal swing adsorption method, and a vacuum swing adsorption method.

13. The electrochemical battery of claim 10, wherein the oxygen generation unit comprises:
a first outlet port connected to the battery module and configured to supply the separated oxygen to the battery module; and
a second outlet port configured to exhaust a gas remaining after the oxygen is separated.

14. The electrochemical battery of claim 13, wherein the air supply unit is configured to adjust the oxygen concentration in the air supplied to the battery module by refluxing a portion of the gas exhausted through the first outlet port or the second outlet port to the oxygen generation unit, and wherein the air supply unit is controlled by the control unit.

15. The electrochemical battery of claim 13, wherein the air supply unit further comprises an oxygen storage unit configured to store oxygen.

16. The electrochemical battery of claim 15, wherein the air supply unit is configured to adjust the oxygen concentration in the air supplied to the battery module by supplying the oxygen from the oxygen storage unit to the first outlet port, and
wherein the air supply unit is controlled by the control unit.

17. The electrochemical battery of claim 10, wherein the air supply unit further comprises a moisture removal unit configured to remove moisture from the suctioned air.

18. The electrochemical battery of claim 17, wherein the control unit is configured to control the air supply unit to supply only moisture-removed air to the battery module by stopping an operation of the oxygen generation unit during charging of the battery module.

19. A method of operating an electrochemical battery, the method comprising:
supplying air to a battery module using an air supply unit, the battery module comprising one or more electrochemical cells; and
controlling the air supply unit to adjust an oxygen concentration in the air supplied to the battery module to operate the electrochemical battery,
wherein the air supply unit comprises an air suction unit configured to suction air from outside of the air supply unit and an oxygen generation unit configured to generate oxygen by separating oxygen from the suctioned air.

20. The method of claim 19, wherein the air supply unit adjusts the oxygen concentration in the air supplied to the battery module by adjusting an amount of nitrogen absorbed from the air.

21. The method of claim 19, wherein the air supply unit variably adjusts the oxygen concentration in air supplied to the battery module according to a state of the battery module.

22. The method of claim 19, wherein, when the oxygen concentration in the battery module is less than the selected concentration, the air supply unit increases the oxygen concentration in the air supplied to the battery module.

23. The method of claim 19, wherein when the oxygen concentration in the battery module is greater than the selected concentration, the air supply unit decreases the oxygen concentration in the air supplied to the battery module.

24. The method of claim 19, wherein the air supply unit maintains the oxygen concentration in the air supplied to the battery module in a range between about 30 volume percent to about 100 volume percent, based on a total content of the air.

25. The method of claim 19, further comprising measuring at least one parameter selected from an oxygen concentration in the battery module, a temperature in the battery module, a voltage of the battery module, a current output of the battery module, and a load resistance of a load to be connected to the battery module.

26. The method of claim 25, wherein the air supply unit adjusts the oxygen concentration in the air supplied to the battery module based on the at least one parameter.

27. The method of claim 26, wherein, when the voltage of the battery module is less than a selected voltage during an electricity generation operation of the battery module, the air supply unit decreases the oxygen concentration in air supplied to the battery module.

28. A method of operating an electrochemical battery, the method comprising:
- supplying air to a battery module comprising one or more metal air cells using an air supply unit;
- measuring an oxygen concentration in the battery module; and
- adjusting an oxygen concentration in the air supplied to the battery module to maintain the oxygen concentration in the battery module at a selected concentration to operate the electrochemical battery,
- wherein the adjusting of the oxygen concentration in the air comprises increasing or decreasing an amount of a non-oxygen gas in the air, and
- wherein the air supply unit comprises an air suction unit configured to suction air from outside of the air supply unit and an oxygen generation unit configured to generate oxygen by separating oxygen from the suctioned air.

* * * * *